J. H. WILLIAMS.
GREASE RETAINER FOR AXLES OF MOTOR VEHICLES.
APPLICATION FILED APR. 18, 1919.
1,343,603.
Patented June 15, 1920.
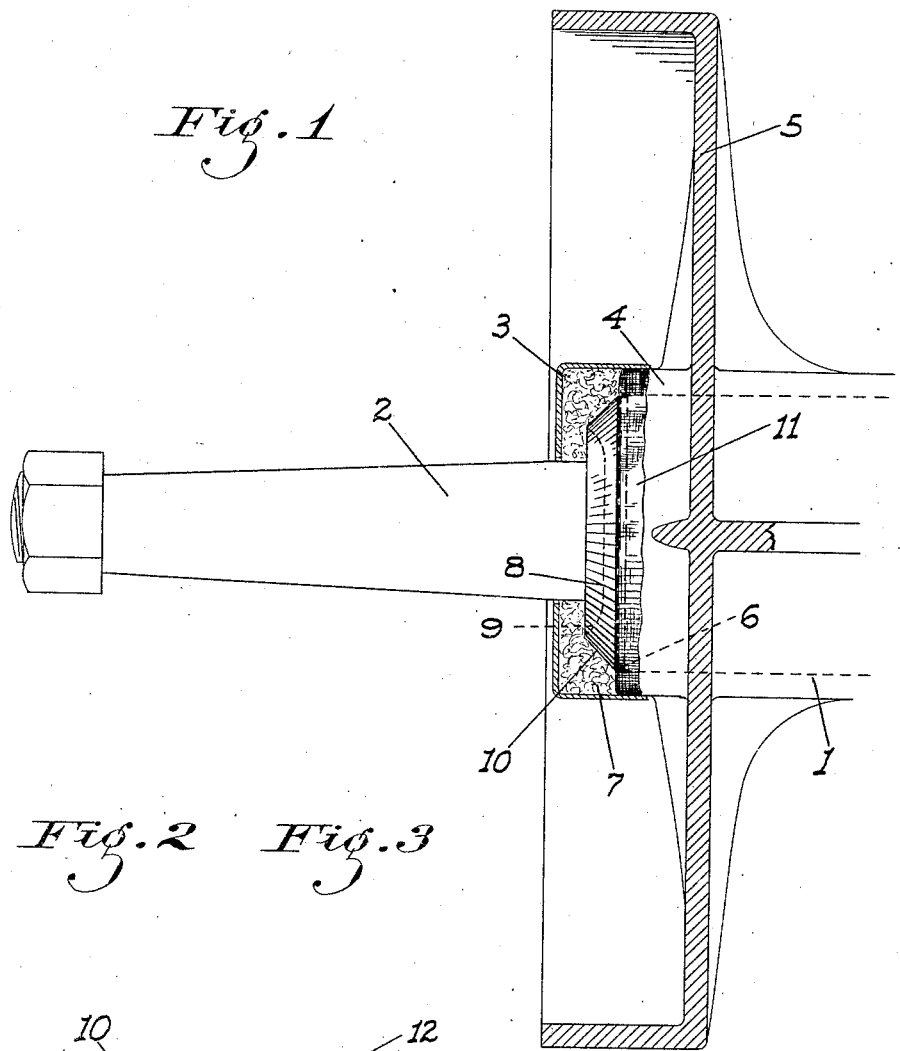
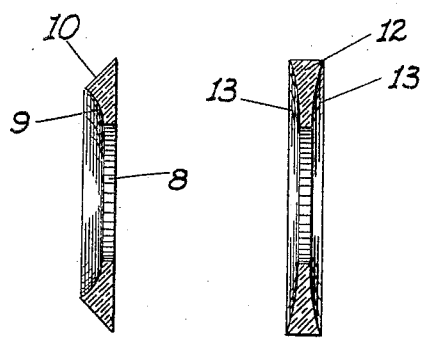
INVENTOR.
John H. Williams
BY
ATTORNEY

UNITED STATES PATENT OFFICE.

JOHN H. WILLIAMS, OF STOCKTON, CALIFORNIA.

GREASE-RETAINER FOR AXLES OF MOTOR-VEHICLES.

1,343,603.  Specification of Letters Patent.  Patented June 15, 1920.

Application filed April 18, 1919. Serial No. 290,907.

*To all whom it may concern:*

Be it known that I, JOHN H. WILLIAMS, a citizen of the United States of America, residing at Stockton, in the county of San Joaquin, State of California, have invented certain new and useful Improvements in Grease-Retainers for Axles of Motor-Vehicles; and I do declare the following to be a clear, full, and exact description of the same, reference being had to the accompanying drawings, and to the characters of reference marked thereon, which form a part of this application.

This invention relates to improvements in grease retainers for the rear axles of motor vehicles, particularly to those of the Ford type, the principal object of the invention being to provide a means whereby the grease carried in the axle housing will be positively held against oozing out between the housing and the axles at the end thereof.

As at present constructed, a felt washer is utilized to retain the grease in place. With use, however, this hole in this washer wears large and becomes hard and the grease can easily issue from the casing and run down the spokes of the wheels and very often flows over the brake drum and prevents the proper operation thereof.

With my improved grease retainer, which may be installed on the vehicle in a very short time and with no changes to the present construction, this condition of affairs will not take place.

Another object is to provide a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate coresponding parts in the several views.

Figure 1 represents a cross-sectional view through the axle housing and brake drum of a motor vehicle of the type above mentioned, showing my improved grease retainer positioned therein.

Fig. 2 is a cross-section through the preferred type of grease-retaining ring.

Fig. 3 is a similar view of a modified form of ring.

Referring now more particularly to the characters of reference on the drawings, the numeral 1 designates the axle housing through which the axle 2 passes, and which is provided with a cap 3 over the projection 4 of the housing into the brake drum 5. A steel washer 6 fits over the axle and seats in the housing against the end of the axle roller bearings in the housing (not shown).

A felt washer 7 is also placed over the axle and is held in position by the cap 3.

My invention consists essentially of a bronze washer 8 adapted to fit snugly over the axle 2 and being flat on its inner face and adapted to bear against the inner end of the washer 6. The outer face of the washer 8 is curved concavely as at 9, from the outer edge of which concave surface the edge of the washer tapers up as at 10 to form a relatively sharp edge adjacent the flat inner face of the washer, by which construction the outer face of the washer is formed as a double wedge.

Should it be necessary or desired, a piece of cloth 11 may be placed over the axle 2 between the washers 6 and 8 and adapted to be squeezed against the outside of the housing 4 by the cap 3.

In the modified form shown in Fig. 3, the washer 12 is concaved on both faces, as at 13, and the felt washer 7 is split, one portion being placed between the washers 6 and 12, and the other portion between the washer 12 and the cap 3.

The principle of operation, referring to the type shown in Fig. 2, is as follows:—

When the cap 3 is pressed over the portion 4 of the housing, the felt washer 7 is squeezed against the axle 2, owing to the wedging action of the concave surface 9 of the washer 8, while at the same time a similar wedging action in an outer direction is caused by the wedge shaped tapered edge 10 of the same, which squeezes the washer 7 against the cap between the same and the edge of the housing 4.

The felt washer is thus caused to bear at all times both against the axle 2 and against the cap, thus effectually preventing any escape of the grease in the housing behind the steel washer 6, this being aided of course by the close fit of the washer 8 on the axle 2.

The cloth 11 may be placed as an added safeguard against escape of the grease.

Hence, should any grease escape between the washers 6 and 8, it will be held confined in the cap, for the felt washer being tightly wedged both against the axle and the cap prevents the escape of the grease in either direction.

Thus, from the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. In combination with an axle housing having an axle therein, and a steel washer on the axle adjacent the end of the housing, an adjustable cap over the end of the housing, a bronze washer on the axle adjacent the steel washer between the same and the cap; the outer face of the washer being wedge shaped, and absorbent and flexible packing material in the cap and filling the entire area inclosed thereby.

2. In combination with an axle housing having an axle therein and projecting therefrom and a steel washer on the axle in the end of the outer end of the housing, felt packing around the axle and filling the area inclosed by the cap, and a thick metal washer on the axle adjacent the steel washer having its outer face wedge shaped and projecting into the felt.

In testimony whereof I affix my signature in presence of two witnesses.

JOHN H. WILLIAMS.

Witnesses:
BERNARD PRIVAT,
F. H. CARTER.